(12) United States Patent
Wang et al.

(10) Patent No.: US 12,179,647 B2
(45) Date of Patent: Dec. 31, 2024

(54) BACKING STRAP SECURED TO A CONCAVE SEATBACK WITH TIE-DOWN STRAPS

(71) Applicant: Lear Corporation, Southfield, MI (US)

(72) Inventors: Qichao Wang, Shanghai (CN); Yong Yang, Shanghai (CN); Peng He, Shanghai (CN); Fengcheng Gu, Shanghai (CN); Chandrashekar Simha, Shanghai (CN); Lizhen Bao, Shanghai (CN); Jiajun Li, Shanghai (CN)

(73) Assignee: LEAR CORPORATION, Southfield, MI (US)

(*) Notice: Subject to any disclaimer, the term of this patent is extended or adjusted under 35 U.S.C. 154(b) by 170 days.

(21) Appl. No.: 18/152,811

(22) Filed: Jan. 11, 2023

(65) Prior Publication Data
US 2023/0322136 A1    Oct. 12, 2023

(30) Foreign Application Priority Data
Apr. 8, 2022 (CN) .................. 202210369022.X

(51) Int. Cl.
| | |
|---|---|
| *B60N 2/58* | (2006.01) |
| *B60N 2/64* | (2006.01) |
| *B60N 2/72* | (2006.01) |
| *B60N 2/90* | (2018.01) |

(52) U.S. Cl.
CPC ......... *B60N 2/5858* (2013.01); *B60N 2/5825* (2013.01); *B60N 2/5883* (2013.01); *B60N 2/643* (2013.01); *B60N 2/646* (2013.01); *B60N 2/976* (2018.02)

(58) Field of Classification Search
CPC ...... B60N 2/5825; B60N 2/5841; B60N 2/64; B60N 2/66
See application file for complete search history.

(56) References Cited

U.S. PATENT DOCUMENTS

| | | | |
|---|---|---|---|
| 5,338,098 A | 8/1994 | Ohnishi | |
| 7,017,997 B2 | 3/2006 | Takezawa et al. | |
| 8,827,371 B2 | 9/2014 | Brncick et al. | |
| 8,919,878 B2 | 12/2014 | Sakamoto | |

(Continued)

FOREIGN PATENT DOCUMENTS

| | | |
|---|---|---|
| DE | 102012011989 | 12/2013 |
| DE | 102014223955 | 6/2015 |

*Primary Examiner* — Shin H Kim
(74) *Attorney, Agent, or Firm* — Brooks Kushman P.C.

(57) ABSTRACT

A vehicle seat having a seat cover including an outer cover, a padding layer, and a backing element that are joined together with stitches or a lamination joint. A seat cover retention apparatus is operatively connected to the backing element wherein a plurality of straps secure the backing element to the vehicle seat structure. Lateral side straps are secured to the backing element and extend through openings defined by the foam bun and are secured to the frame and/or the foam bun. A center strap is secured to the backing element and extends through a center opening to be secured to a back side of the foam bun and/or frame. The backing element may be an elastic strap or a layer of non-woven fleece material with slits for the straps. The straps may be elastic material or non-woven material.

20 Claims, 4 Drawing Sheets

(56) References Cited

U.S. PATENT DOCUMENTS

| | | | |
|---|---|---|---|
| 2006/0178603 A1 | 8/2006 | Popescu | |
| 2014/0203603 A1* | 7/2014 | Line | B60N 2/7005 |
| | | | 297/284.3 |
| 2015/0001899 A1* | 1/2015 | Line | B60N 2/809 |
| | | | 297/396 |
| 2015/0175042 A1* | 6/2015 | Galbreath | B60N 2/5825 |
| | | | 297/452.48 |
| 2015/0360592 A1* | 12/2015 | Wroblewski | B60N 2/933 |
| | | | 297/330 |
| 2016/0243967 A1* | 8/2016 | Seibold | B60N 2/38 |
| 2016/0311352 A1* | 10/2016 | Kheil | B60N 2/5825 |
| 2017/0066356 A1* | 3/2017 | Niwa | B60N 2/7094 |
| 2018/0056836 A1* | 3/2018 | Schacht | B60N 2/70 |
| 2019/0366892 A1* | 12/2019 | Booth | B60N 2/5825 |
| 2020/0247290 A1* | 8/2020 | Line | B60N 2/66 |
| 2021/0078518 A1* | 3/2021 | Tanabe | B60N 2/5825 |
| 2022/0080866 A1* | 3/2022 | Matsumoto | B68G 7/12 |
| 2022/0089074 A1* | 3/2022 | Witte | B60N 2/68 |
| 2022/0242287 A1* | 8/2022 | Cuerda | F16B 2/22 |
| 2022/0274515 A1* | 9/2022 | Barlow | B60N 2/70 |
| 2023/0322136 A1* | 10/2023 | Wang | B60N 2/5825 |
| | | | 297/452.18 |

\* cited by examiner

BACKING STRAP SECURED TO A CONCAVE SEATBACK WITH TIE-DOWN STRAPS

CROSS-REFERENCE TO RELATED APPLICATIONS

This application claims foreign priority benefits under 35 U.S.C. § 119 (a)-(d) to CN application No. 202210369022.X, filed on Apr. 8, 2022, which is incorporated by reference in its entirety.

TECHNICAL FIELD

This disclosure relates to concave vehicle seat backs.

BACKGROUND

Vehicle seats may be constructed to provide a generally concave seat back surface and may also include side bolsters that partially wrap around the seat occupant. Concave surfaces result in trim cover floating which can result in saggy baggy appearance in initial or usage conditions.

Such vehicle seats may include various accessories such an adjustable lumbar system, a massage system, and/or adjustable bolsters. Actuators for such systems may be pneumatic or mechanical systems that move the seat cover in a fore-and-aft direction. One problem when such systems are incorporated in a seat with a concave seat back is that the seat cover may over time become loose and fail to return to the desired concave shape.

This disclosure is directed to solving the above problems and other problems as summarized below.

SUMMARY

According to a first aspect of this disclosure, a vehicle seat is disclosed that has a concave seating surface and may have a massage system and/or an adjustable lumbar adjustment system. The seat includes a frame including a plurality of connected wires or bars and a foam bun supported by the frame. The foam bun defines a right side opening, a left side opening, and a center opening. A seat cover includes an outer cover and a padding layer sewn, laminated or otherwise joined together in a quilting pattern with spaced apart quilting stitches. A backing strap is joined to the padding layer. A plurality of straps secure the backing strap to the frame and the foam bun at spaced locations.

A right side strap and a left side strap may be secured to the backing strap adjacent the right side opening and the left side opening, respectively. The right side strap and the left side strap extend through the right side opening and the left side opening, respectively, and are secured to the frame. A center strap is secured to the backing strap adjacent the center opening, extends through the center opening, and is secured to the back side of the foam bun that faces the frame.

Further aspects of the above vehicle seat may include that the backing strap extends horizontally across the padding layer. Alternatively, the backing strap may extend vertically or diagonally. More than one backing strap may be provided as necessary to eliminate bagginess in the seat cover.

The vehicle seat may also include a seatback shell that the frame is attached to and that is disposed on the opposite side of the frame from the foam bun. The right side strap, left side strap, and center strap may be attached to the frame or the foam bun.

The right side strap and the left side strap a may be loops that are looped around the backing strap, and wherein the center strap is a loop that is looped around the backing strap. The right side strap may be attached to a right side hook that is hooked over a wire of the frame, and the left side strap may be attached to a left side hook that is hooked over a wire of the frame. More than two lateral side retention straps may be provided, as needed. The center strap may be attached to an adhesive pad that secures the center backing strap to the back side of the foam bun. The center strap may also be secured to the frame with a hook or otherwise.

The vehicle seat may further comprise an actuator secured to the foam bun that is adapted to push and pull the seat cover in fore and aft directions to provide a massage function to a person seated in the seat. The actuator may be a pneumatic actuator that may be inflated and deflated to push and pull the seat cover or the actuator may be a mechanical actuator.

According to a second aspect of the disclosure, a vehicle seat is disclosed that includes a plurality of restraining structures at vertically spaced location on the seat back. The seat includes a frame including a plurality of connected wires. A foam bun has a concave front surface and including a back surface supported by the frame. The foam bun defines a plurality of vertically spaced right side openings, a plurality of vertically spaced left side openings, and a plurality of vertically spaced center openings. A seat cover is provided that includes an outer cover and a padding layer or fleece sewn, laminated or otherwise joined together. A plurality of vertically spaced backing straps extend horizontally across the seat cover and are joined to the padding layer or fleece. A plurality of right side straps are secured to one of the backing straps adjacent one of the right side openings and a plurality of left side straps are secured to one of the backing straps adjacent the one of the left side openings. The right side straps each extend through one of the right side openings and are secured to the frame or foam bun and the left side straps extend through the left side opening and are secured to the frame or foam bun. A plurality of center straps are secured to one of the backing straps adjacent one of the center openings and extend through the center opening and are secured to the back side of the foam bun that faces the frame or are secured to the frame.

The vehicle seat may further comprise a seatback shell that the frame is attached to and that is disposed on the opposite side of the frame from the foam bun.

The right side straps, the left side straps, and the center straps may be loops that are looped around the backing straps. The right side straps may each be attached to a right side hook that is hooked over a wire of the frame, and the left side straps may each be attached to a left side hook that is hooked over a wire of the frame. The center straps may each be attached to an adhesive pad that secures the center straps to the back side of the foam bun.

The vehicle seat may further comprise a plurality of actuators secured to the foam bun that are adapted to push and pull the seat cover in fore and aft directions to provide a massage function to a person seated in the seat. The actuators may be pneumatic actuators that are inflated and deflated to push and pull the seat cover.

According to a third aspect of this disclosure a method of manufacturing a vehicle seat comprises the steps of providing a seat back shell and a frame that support a foam bun that defines a concave seating surface. Sewing a layer of padding and a backing strap that extends horizontally across a back surface of the padding layer to a seat cover with spaced stitches in a quilt-like pattern. Assembling a right side strap loop around the backing strap, through a right side opening defined by the foam bun, and attaching the right side strap loop to the frame. Assembling a left side strap loop around the backing strap, through a left side opening defined by the foam bun, and attaching the left side strap loop to the frame. Assembling a center strap loop around the backing strap, through a center opening defined by the foam bun, and attaching the center strap loop to a backside surface of the foam bun.

The method may further include the step of assembling an actuator to the seating surface of the foam bun that moves the seat cover in a fore and aft direction to provide a massage function for the vehicle seat. The method of may further comprise attaching a first hook to the right side strap loop that is used to attach the right side strap loop to the frame, and attaching a second hook to the left side strap loop that is used to attach the left side strap loop to the frame. The method may also further comprise attaching an adhesive pad to the center strap loop that is used to attach the center strap loop to the back side surface of the foam bun.

The above aspects of this disclosure and other aspects will be described below with reference to the attached drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
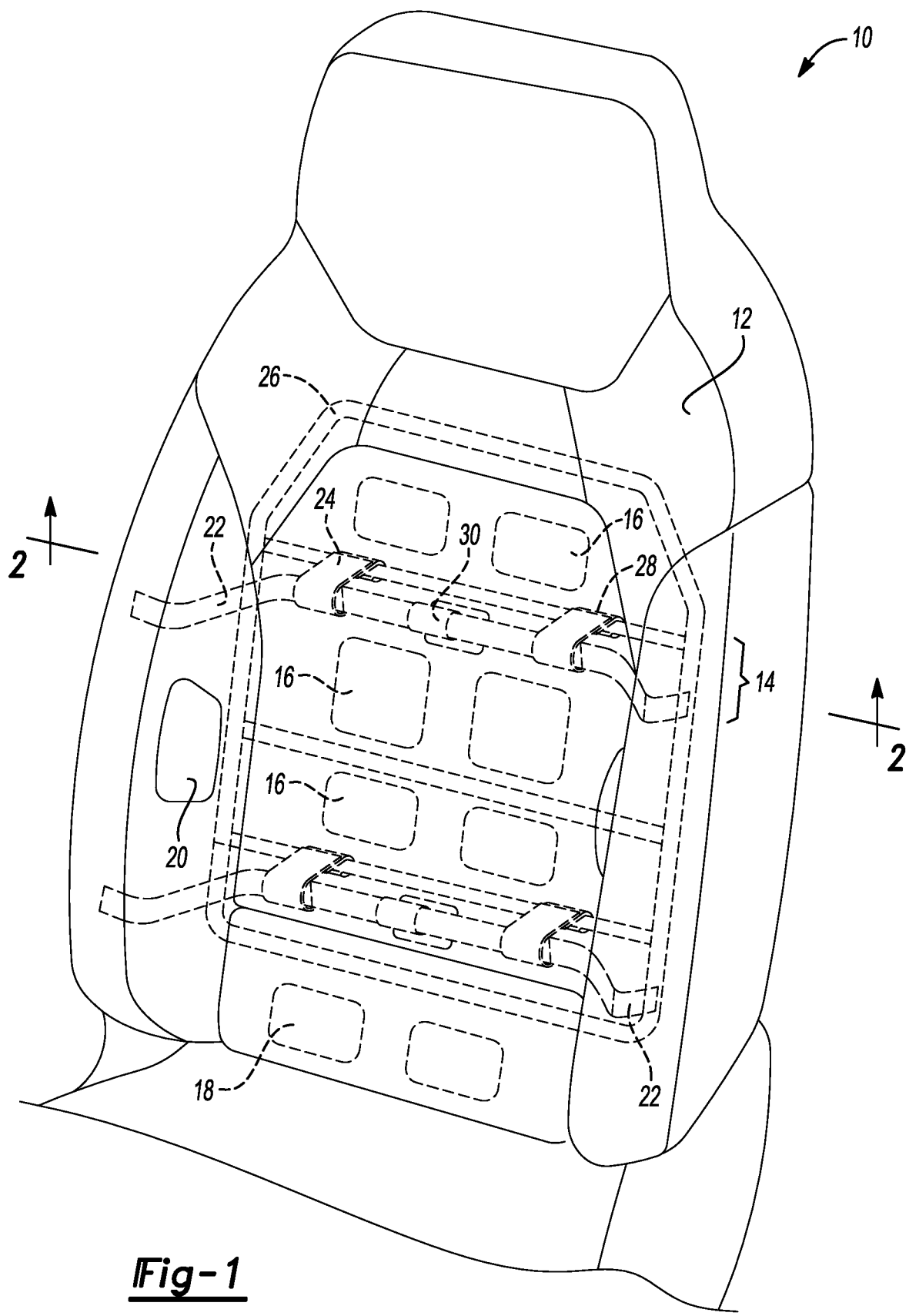
FIG. 1 is a fragmentary perspective view of a vehicle seat illustrating one embodiment of the seat cover retraction apparatus of this disclosure.

Referring to FIG. 1, a vehicle seat 10 having a seat back 12 with a concave surface is illustrated that includes a seat cover retraction apparatus 14. A plurality of massage actuators 16 may be provided that are preferably pneumatic actuators that move the seat cover in a fore-and-aft direction. The vehicle seat 10 may also include a plurality of lumbar support adjusters 18 that may be mechanical or are more preferably pneumatically actuated. Bolster adjusters 20 may also be provided on the sides of the vehicle seat to more closely wrap around the sides of a person seated on the vehicle seat 10. The disclosed vehicle seat may benefit from the use of the seat cover retraction apparatus 14 even without the inclusion of the actuators.

One or more backing straps 22 may be secured to the seat cover as will be described below with reference to FIGS. 2 and 3. A pair of lateral side retention straps 24 including a right side retention strap and a left side retention strap are looped over the one or more backing straps 22 and secured to a wire frame 26 that is part of the seat back support structure. Additional side retention straps 24 may also be provided, as needed to restrain the seat cover. A pair of hooks 28 are secured one to each of the lateral side retention straps 24. A central retention strap 30 may be secured to each of the backing straps 22 and, in turn to the seat cover as will be described below with reference to FIGS. 2 and 3.

In one embodiment, the backing strap 22 that is sewn to the foam backing material and seat cover material (that may be made of leather or other type of seat cover material) the backing strap may be elastic. If the backing straps 22 are elastic, associated lateral side retention straps 24 and central retention strap 30 may be made of a non-woven or fabric material.

In another embodiment, the backing straps 22 may be sewn, laminated, or otherwise joined to the foam backing material and seat cover. If the backing strap 22 is a non-woven or fabric material, the lateral side retention straps 24 may be made of an elastic material and the central retention strap 30 may be made of a non-woven or fabric material.

In yet another embodiment, the backing strap 22 and the lateral side retention straps 24 may be made of an elastic material and the central retention strap 30 may be made of a non-woven or fabric material.

Figure 2:
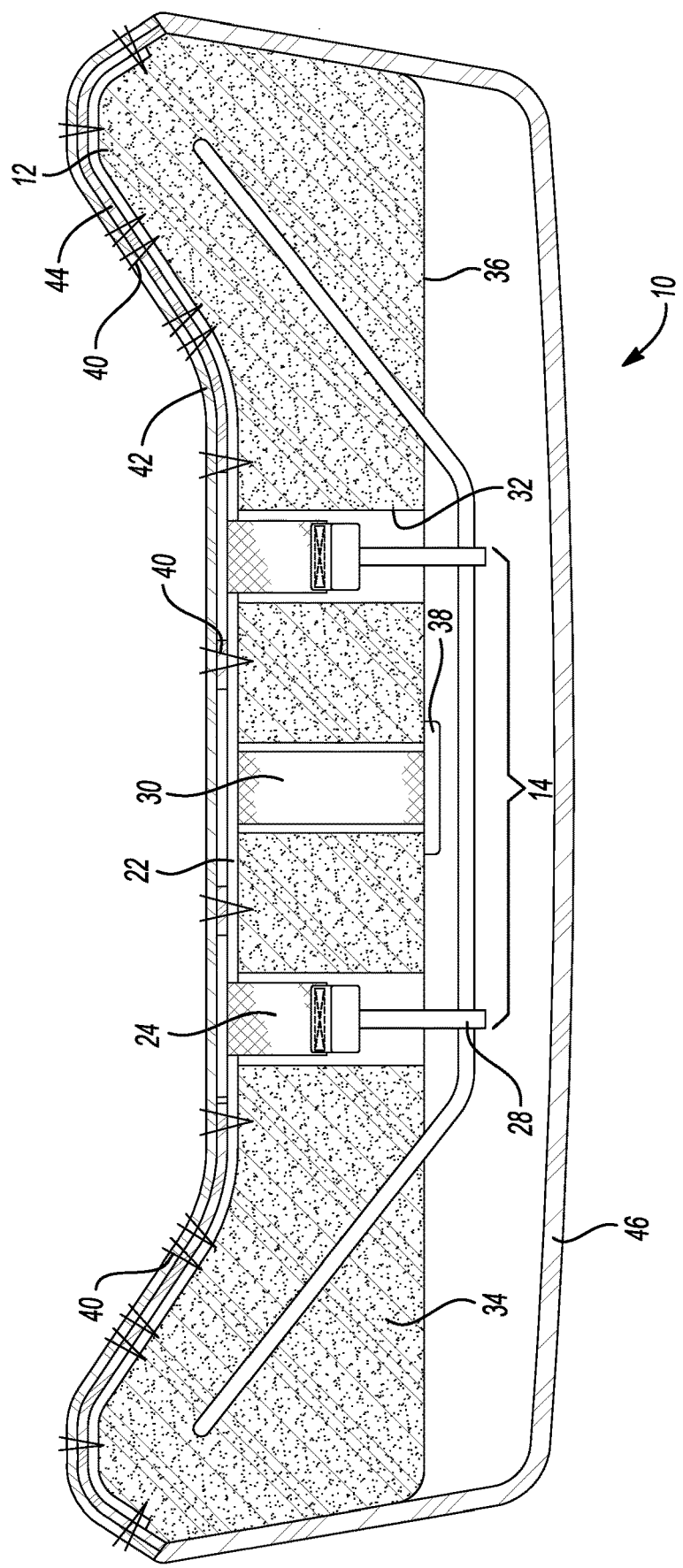
FIG. 2 is a cross-section view taken along the line 2-2 in FIG. 1.
Figure 3:
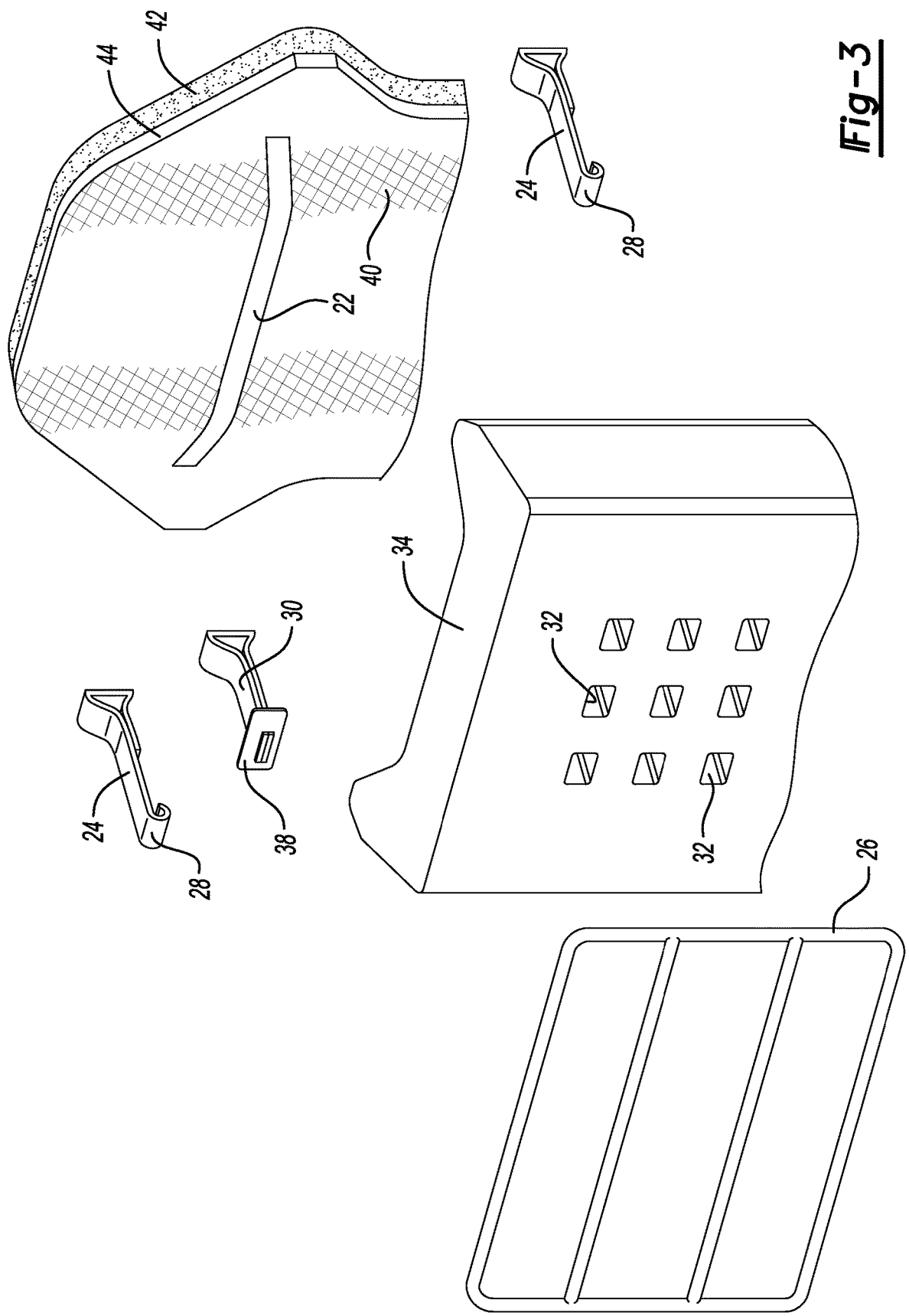
FIG. 3 is a partial exploded perspective view of the seat cover retraction apparatus of FIG. 1.

Referring to FIGS. 2 and 3, one embodiment of the seat back 12 and seat cover retraction apparatus 14 is shown in cross-section. The backing strap 22 is shown with the lateral side retention straps and the central retention strap 30 looped over the backing strap 22. The lateral side retention straps 24 extend through openings 32 defined by a foam bun that forms the body of the seat back 12. The lateral side retention straps 24 are secured to the wire frame 16. The central retention strap 30 also extends through one of the openings defined by the foam bun 34. The central retention strap 30 is attached with a polypropylene or polyethylene pad adhesively, or otherwise, secured to a back surface 36 of the foam bun 34. The lateral side retention straps 24 anchor the left and right sides of the seat cover to the wire frame 26 and function to retract the seat cover after the massage actuators 16 are inflated to move the seat cover in a fore-and-aft direction. The central strap 30 is secured to the back surface 36 of the foam bun 34 to allow greater freedom of movement in the central area of the seat back cover 12 when the massage actuators are inflated and also retract the seat cover after inflation. The center strap 30 could alternatively be attached to the wire frame 26.

The backing strap 22 is sewn with quilt stitching 40 to the seat cover 42 and a foam backing layer 44. The backing strap 22 could be laminated or otherwise joined to the seat cover. The quilt stitching and foam backing layer 44 are provided to enhance to comfort provided by the seat cover 42. The quilt stitching also secures the backing strap 22 to the seat cover 42 and the foam backing layer 44 without requiring additional manufacturing steps to the seat back assembly process.

The arrangement of the seat back 12 structural elements is also shown in FIG. 2 with a seat back shell 46 backing the wire frame 26. The foam bun 34 is assembled in front of the wire frame 26. The seat cover 42 and foam backing layer 44 are wrapped around the foam bun 34. The backing strap 22 is quilt stitched or otherwise joined to the back of the foam backing layer 44 and/or seat cover as previously described. The lateral side retention straps 24 secure the backing strap 22 to the wire frame 26 and the central retention strap 30 secures the backing strap 22 to the back surface 36 of the foam bun 34 or frame 26.

Figure 4:
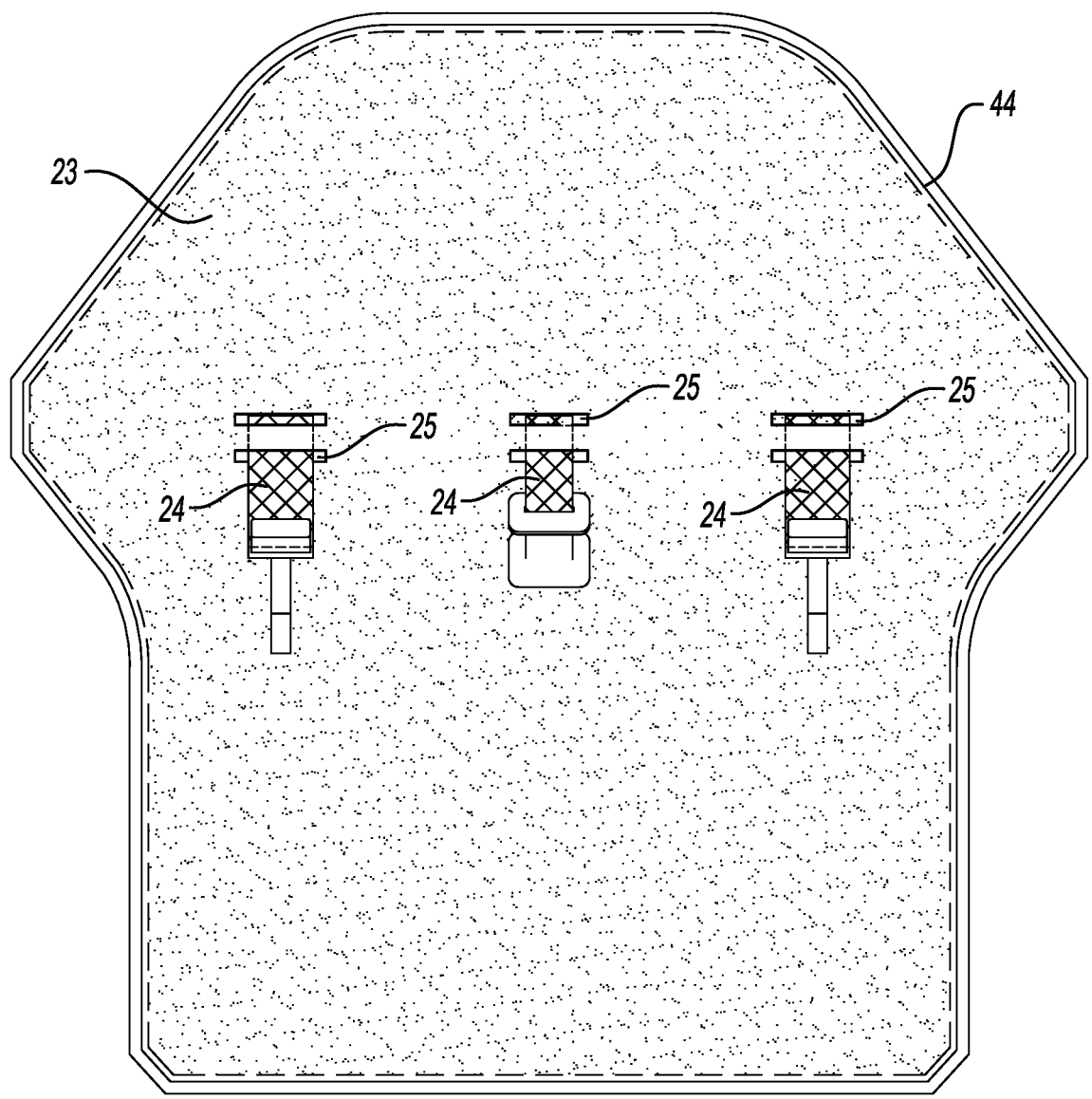
FIG. 4 is a rear side elevation view of a portion of the seat cover retraction apparatus shown with a backing member attached to the foam backing of the seat cover.

As shown in FIG. 4, instead of a backing strap 22, a fleece material 23, or a non-woven or fabric material, may be attached to the back of the seat cover and slits 25 may be provided in the fleece material with the lateral side retention straps 24 and central retention straps 30 that may be attached to, or looped through, the slits in the fleece material 23. Some of the straps 24 and 30 may be elastic to provide resiliency and some of the straps may be made of non-woven material.

Figure 5:
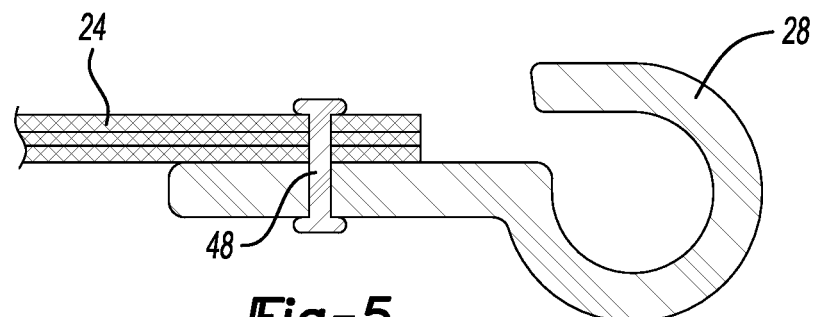
FIG. 5 is a fragmentary side elevation view of a side strap attached to a hook.

Referring to FIG. 5, one of the lateral side retention straps 24 is shown to be attached to one of the hooks 28 (or J-retainer) with a fastener 48. Instead of a fastener 48, the lateral side retention strap 24 could be secured in an insert molding operation to a plastic hook. Alternatively, the hook 28 may be secured with an adhesive to the lateral side retention strap 24.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
   a frame including a plurality of connected wires;
   a foam bun supported by the frame, the foam bun defining a plurality of openings;
   a seat cover including an outer cover and a padding layer;
   a backing element joined to a back surface of the outer cover and padding layer; and
   a plurality of straps securing the backing element to the frame and the foam bun at spaced locations.

2. The vehicle seat of claim 1 wherein the plurality of straps further comprise:
   a right side strap secured to the backing element adjacent a right side opening defined by the foam bun and a left side strap secured to the backing strap adjacent a left side opening defined by the foam bun, wherein the right side strap extends through the right side opening and is secured to the frame, and wherein the left side strap extends through the left side opening and is secured to the frame; and
   a center strap secured to the backing strap adjacent the center opening and extends through the center opening and is secured to a back side of the foam bun that faces the frame.

3. The vehicle seat of claim 2 wherein the right side strap and the left side strap include loops that are looped around the backing strap, and wherein the center strap includes a center loop that is looped around the backing strap.

4. The vehicle seat of claim 3 wherein the right side strap is attached to a right side hook that is hooked over a wire of the frame, and the left side strap is attached to a left side hook that is hooked over a wire of the frame.

5. The vehicle seat of claim 3 wherein the center strap is attached to an adhesive pad that secures the center strap to the back side of the foam bun.

6. The vehicle seat of claim 1 wherein the backing element is an elastic strap, and wherein the elastic strap is joined to the outer cover and padding layer with spaced apart stitches.

7. The vehicle seat of claim 1 wherein the backing element is a non-woven fleece material that is joined to the outer cover and padding layer, and wherein the non-woven fleece material defines a plurality of slits that the plurality of straps are received in to secure the non-woven fleece material to the frame and foam bun.

8. The vehicle seat of claim 1 further comprising:
   an actuator secured to the foam bun that is adapted to push and pull the seat cover in fore and aft directions to provide a massage function to a person seated in the vehicle seat.

9. The vehicle seat of claim 1 wherein the backing element joined to the outer cover and padding layer as a lamination.

10. The vehicle seat of claim 1 wherein the foam bun defines a concave seating surface.

11. A vehicle seat comprising:
    a frame including a plurality of connected wires;
    a foam bun having a concave front surface and including a back surface supported by the frame, the foam bun defining a plurality of right side openings, a plurality of left side openings, and a plurality of center openings, wherein each of the respective openings are vertically spaced;
    a seat cover including an outer cover and a padding layer joined together;
    at least one backing element extending across a back surface of the seat cover and being joined to the padding layer;
    a plurality of right side straps secured to the at least one backing element adjacent one of the right side openings and a plurality of left side straps secured to the at least one backing element adjacent the one of the left side openings, wherein the right side straps each extend through one of the right side openings and is secured to the frame or foam bun, and wherein the left side straps each extend through one of the left side openings and is secured to the frame or foam bun; and
    a plurality of center straps secured to one of the backing straps adjacent one of the center openings and extend through one of the center openings and are secured to a back side of the foam bun that faces the frame or the frame.

12. The vehicle seat of claim 11 wherein the backing element is an elastic strap, and wherein the elastic strap is joined to the outer cover and padding layer with spaced apart quilting stitches.

13. The vehicle seat of claim 11 wherein the backing element is a non-woven fleece material that is joined to the outer cover and padding layer, and wherein the non-woven fleece material defines a plurality of slits that the plurality side straps and center straps are received in to secure the non-woven fleece material to the frame and foam bun.

14. The vehicle seat of claim 13 wherein the right side straps are each attached to a right side hook that is hooked over a wire of the frame, and the left side straps are each attached to a left side hook that is hooked over a wire of the frame.

15. The vehicle seat of claim 14 wherein the center straps are each is attached to an adhesive pad that secures the center straps to the back side of the foam bun.

16. The vehicle seat of claim 11 further comprising:
    a plurality of actuators secured to the foam bun that are adapted to push and pull the seat cover in fore and aft directions to provide a massage function to a person seated in the vehicle seat.

17. The vehicle seat of claim 11 wherein the backing element joined to the outer cover and padding layer as a lamination.

18. A method on manufacturing a vehicle seat comprising:
providing a seat back shell and a frame that support a foam bun that defines a concave seating surface;
joining a padding layer and a backing element to a seat cover, wherein the backing element extends across a back surface of the padding layer;
assembling a right side strap to the backing element, through a right side opening defined by the foam bun, and attaching the right side strap loop to the frame;
assembling a left side strap to the backing element, through a left side opening defined by the foam bun, and attaching the left side strap loop to the frame; and
assembling a center strap to the backing element, through a center opening defined by the foam bun, and attaching the center strap loop to a backside surface of the foam bun.

19. The method of claim 18 wherein the step of joining a padding layer, and a backing element to a seat cover is performed by sewing the backing element that is made of an elastic material to the padding layer and the seat cover with spaced apart quilting stitches.

20. The method of claim 18 wherein the step of joining a padding layer, and a backing element to a seat cover is performed by laminating the backing element that is made of a non-woven material to the padding layer and the seat cover.

* * * * *